United States Patent [19]

Mills

[11] Patent Number: 4,461,322

[45] Date of Patent: Jul. 24, 1984

[54] ACCUMULATOR WITH PISTON-POPPET SEAL ASSEMBLY

[76] Inventor: Carl R. Mills, Rte. 1, Box 353, East Dundee, Ill. 60118

[21] Appl. No.: 492,203

[22] Filed: May 6, 1983

[51] Int. Cl.³ .............................................. F16L 55/04
[52] U.S. Cl. ................................................... 138/31
[58] Field of Search ............................... 138/26, 30, 31

[56] References Cited

U.S. PATENT DOCUMENTS

| | | | |
|---|---|---|---|
| 2,754,847 | 7/1956 | Ashton et al. | 138/31 |
| 2,764,997 | 10/1956 | McCuistion | 138/31 |
| 2,764,998 | 10/1956 | McCuistion | 138/31 |
| 2,875,789 | 3/1959 | Wright | 138/31 |
| 3,317,002 | 5/1967 | McKenzie | 138/31 X |
| 3,467,140 | 9/1969 | Hanson | 138/31 |
| 4,014,213 | 3/1977 | Parquet | 138/31 X |
| 4,201,522 | 5/1980 | Toyota et al. | 138/31 X |
| 4,375,227 | 3/1983 | Wegscheider | 138/31 |

FOREIGN PATENT DOCUMENTS 1373342  4/1964  France ................................. 138/31

Primary Examiner—James E. Bryant, III
Attorney, Agent, or Firm—Augustus G. Douvas

[57] ABSTRACT

A piston accumulator having a piston-poppet assembly to equalize substantially the liquid-gas pressure appearing across a piston seal. The assembly projects into the hydraulic chamber from its housed position within a socket recess formed in the piston. In response to an excess pressure differential between the gas chamber and liquid chamber of the accumulator, the assembly prematurely seals off the hydraulic passage which communicates with the hydraulic chamber of the accumulator. This premature sealing operation traps and pressurizes a small portion of hydraulic liquid within the reduced hydraulic chamber so that the pressure differential which would otherwise appear across the piston seal is reduced or eliminated.

3 Claims, 8 Drawing Figures

ACCUMULATOR WITH PISTON-POPPET SEAL ASSEMBLY

BACKGROUND OF THE INVENTION

This invention relates to a piston accumulator having a piston-poppet assembly to equalize substantially the liquid-gas pressure appearing across the piston seal. Such as arrangement greatly reduces gas charge leakage into the hydraulic chamber of the accumulator.

Most piston accumulators incorporate two seals on the piston. One seal contains the liquid and the other seal contains the gas, with a space between the two seals. Other piston accumulators employ only one piston seal to separate the liquid and gas directly.

With either sealing arrangement, a possible leakage problem occurs when there is pressure exerted only on one side of a seal. The problem is particularly aggravated if pressure exists only on the gas side of the piston. With this condition, the gas will eventually bypass the seal and flow into the hydraulic side when the hydraulic pressure is at a low value or zero. The efficiency of the accumulator is thus reduced, and the accumulator operation impaired.

SUMMARY OF THE INVENTION

A principal object of this invention is to improve the efficiency and operation of piston accumulators by minimizing or reducing leakage across the piston seal or seals.

The principal structural feature for attaining this object is the inclusion of a reciprocating or floating piston-poppet assembly within a socket located on the hydraulic side of the piston.

The piston-poppet assembly projects into the hydraulic chamber. The assembly is sandwiched between an accumulator end cap which defines the hydraulic chamber and the piston when the piston is driven toward that end cap. In response to a pressure differential between the gas chamber and the liquid chamber, the assembly prematurely seals off the hydraulic passage which communicates with the hydraulic chamber of the accumulator. This premature sealing operation traps and pressurizes a small portion of hydraulic liquid within the reduced hydraulic chamber so that the pressure differential which would otherwise appear across the piston seal or seals is reduced or eliminated.

DETAILED DESCRIPTION OF THE DRAWINGS

In order that all of the structural features for attaining the objects of this invention may be readily understood, reference is made to the accompanying drawings wherein.

DETAILED DESCRIPTION OF THE PREFERRED EMBODIMENTS

Figure 1:
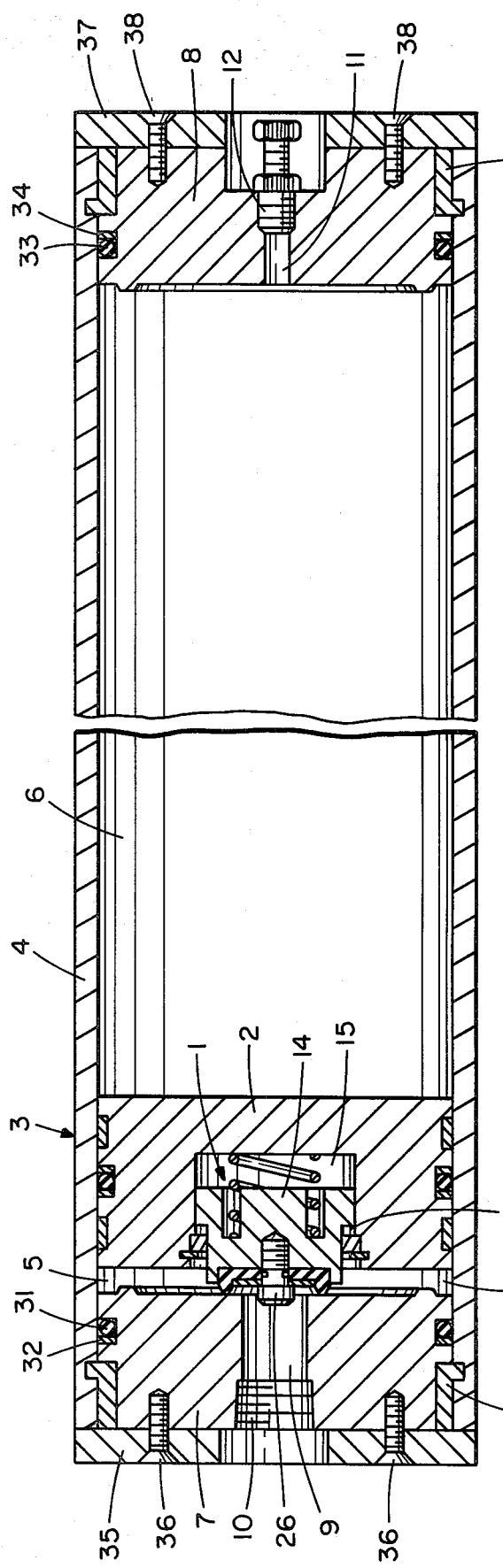
FIG. 1 is a longitudinal sectional view of a preferred embodiment of the accumulator showing the piston-poppet assembly of this invention disposed in the position to seal the hydraulic passage communicating with the hydraulic chamber.

Referring to FIGS. 1–6, a first preferred embodiment of piston-poppet assembly 1 is shown applied to reciprocating piston 2 of hydraulic accumulator 3. Piston 2 is positioned within the bore of cylinder tube 4 to subdivide the bore into a hydraulic chamber 5 and a gas chamber 6 of variable volumes. The purpose of the novel piston-poppet assembly 1 herein described is to prevent the gas charge within gas chamber 1 from leaking excessively into the hydraulic chamber 5.

The possibility of gas leakage is enhanced when liquid pressure within the hydraulic chamber is at a low value at the time of liquid discharge at the hydraulic chamber outlet. As outlined herein, piston-poppet assembly seals the liquid discharge outlet at the final stage of discharge. This operation traps a limited quantity of hydraulic liquid to equalize substantially the liquid-gas pressure appearing on the opposite sides of the piston seal.

Hydraulic head or end cap 7 closes the end of the cylinder bore that defines hydraulic chamber 5, and gas head or end cap 8 closes the end of the cylinder bore that defines gas chamber 6. Head 7 is formed with a hydraulic liquid passage 9 that includes internally threaded oil port 10, and head 8 is formed with a gas passage 11 that receives one-way gas valve 12. Hydraulic liquid flows into and out of hydraulic chamber 5 through passage 10, and gas flows into gas chamber 6 through passage 11.

Most piston accumulators use two seals on the accumulator piston (such as, piston 2), one seal to contain the hydraulic liquid and a second seal to contain the gas separate from the liquid with an isolated space between the two seals. However, some piston accumulators incorporate only one piston seal to serve as the sole and direct separation for the liquid and gas. It is only necessary to have one piston seal (such as seal 13, FIGS. 1, 2) for satisfactory use of the piston-poppet assembly 1 of this invention, although piston-poppet assembly 1 would work with a two-seal piston design even if one of the two seals were to fail.

In particular, piston-poppet 14 is partially housed within piston-poppet assembly socket or recess 15 located on the hydraulic side of piston 2. Piston-poppet 14 is retained within socket 15 by poppet retaining ring 16 which is lodged within a locking groove formed in piston 2. Glide ring 17 is positioned within a locking groove also formed in piston 2. Fixed glide ring 17 collars the necked-down portion 18 of poppet 14 to enable poppet 14 to reciprocate easily into and out of socket 15.

Figure 2:
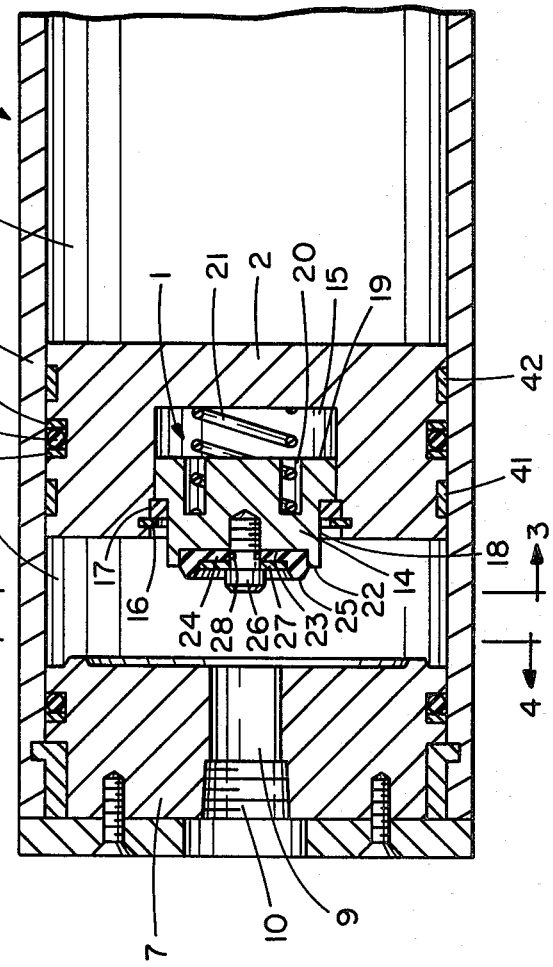
FIG. 2 is a fragmentary view related to FIG. 1 showing the piston-poppet assembly withdrawn from the sealing position of FIG. 1 to enable hydraulic liquid to flow through the hydraulic passage.
Figure 3:
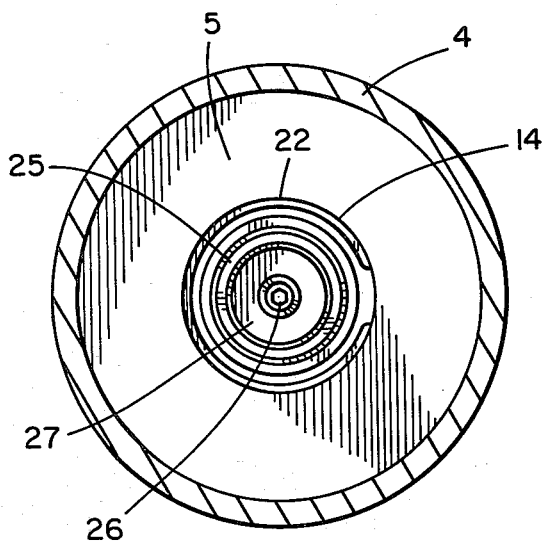
FIG. 3 is a section view taken along line 3—3 of FIG. 2 showing an end view of the piston-poppet assembly.
Figure 4:
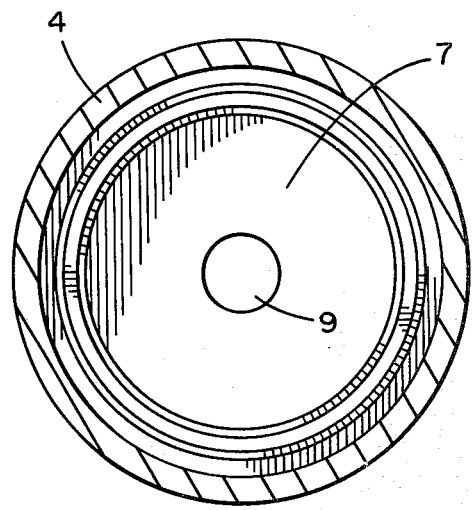
FIG. 4 is a section view taken along line 4—4 of FIG. 2 showing an end view of the accumulator head having the hydraulic passage which is sealed by the piston-poppet assembly.
Figure 5:
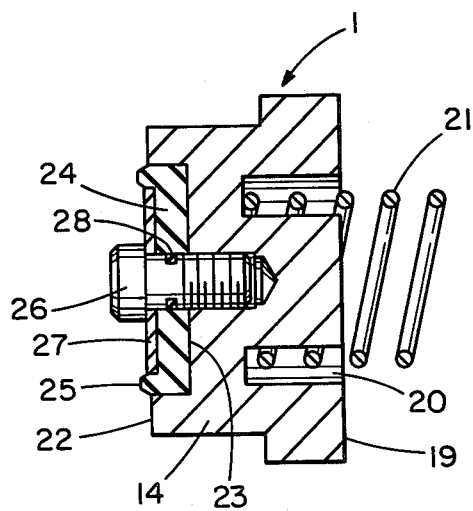
FIG. 5 is an enlarged section view of the piston-poppet assembly of the prior figures which shows construction details.
Figure 6:
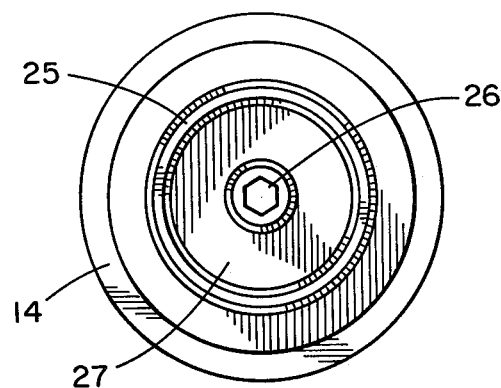
FIG. 6 is an end view of the piston-poppet assembly of FIG. 5.

The enlarged head portion of poppet 14 is formed with an annular groove 20 which receives helical spring 21. Spring 21 is a relatively weak spring which gently forces piston-poppet 14 into its projecting position as shown in FIG. 2. Socket 15 is filled with hydraulic liquid which flows past poppet 14 due to a relatively loose fit whenever chamber 5 contains liquid.

The projecting face 22 of poppet 14 is formed with a circular recess 23 which receives circular poppet seal 24. Circular seal 24 has an annular projecting lip 25. The seal ring formed by annular lip 25 overlaps and seals off the opening of hydraulic passage 9 from communication with hydraulic chamber 5 when piston 2 is driven by gas pressure to the position shown in FIG. 1. In this position, a quantity of hydraulic liquid is trapped in the reduced chamber 5 (FIG. 1). This liquid is retained at a pressure which is relatively high, and accordingly, both the liquid and gas sides of piston seal 13 are subjected to high pressures having a small or no significant differential. With this application of liquid and gas pressures to piston seal 13 there is a substantially reduced tendency for high pressure gas within gas chamber 6 to leak past piston seal 13 into hydraulic chamber 5 when that chamber is in a low liquid pressure operating condition.

Poppet seal and retainer screw 26 engages metallic poppet seal retainer 27 to fix poppet seal 25 to the body of poppet 14. Poppet seal O-ring 28 is carried on the shank of retainer screw 26.

End cap 7 is retained on cylinder tube 4 by split shear ring 29, and end cap 8 is retained on cylinder tube 4 by split shear ring 30. Head O-ring 31 and non-extrusion ring 32 create a seal between end cap 7 and cylinder tube 4, and head O-ring 33 and non-extrusion ring 34 create a seal between end cap 8 and cylinder tube 4. Retainer plate 35 is fixed to end cap 7 by flat-head screws 36, and retainer plate 37 is fixed to end cap 8 by flat-head screws 38.

Piston seal 13 is sandwiched between non-extrusion rings 39 and 40 which are located on piston 2, and wear rings 41 and 42 are carried by piston 2.

The detailed mode of operation of piston-poppet assembly 1 during charging and discharging of accumulator 3 to reduce gas leakage at piston seal 13 is as follows:

Initially gas flows into gas chamber 6 through passage 11 acting as a gas inlet. Piston 2 is driven to the left to an extent determined by the hydraulic pressure within chamber 5.

If liquid is absent from hydraulic chamber 5 during the charging phase, as piston 2 reciprocates to the left (FIGS. 1, 2), piston-poppet assembly 1 is projected from socket 15 by helical spring 21. Ultimately piston 2 and piston-poppet assembly 1 will assume the position shown in FIG. 1, with piston-poppet 14 retracting into socket 15. This action compresses helical spring 15 to create space 43. Annular projecting lip 25 of circular poppet seal 24 seals off hydraulic passage 9.

Since it was assumed that no hydraulic liquid was present in accumulator 3, the reduced chamber 5 (FIG. 1) does not contain pressurized liquid which is capable of creating a hydraulic back pressure on piston seal 13 to equalize the gas pressure exerted on the opposite side of seal 13. Accordingly, in this mode of operation there is no substantial tendency to prevent bypass gas leakage at piston seal 13.

If, however, during the initial gas charging step (FIG. 2) hydraulic liquid is present within chamber 5, a portion of this liquid will be trapped within reduced hydraulic chamber 5 (FIG. 1) when hydraulic passage 9 is sealed off. With this preferred mode of operation, a hydraulic back pressure is applied to piston seal 13 which substantially reduces the liquid-gas pressure differential across piston seal 13. Therefore, the tendency for gas leakage at piston seal 13 is reduced or substantially eliminated.

Thereafter, as hydraulic liquid is pumped through passage 9 to drive piston 2 to the right (FIG. 2), chamber 5 is enlarged and piston-poppet 14 assumes the projected position shown in FIG. 2. It should be noted that the chamber defined by socket recess 15 is filled with hydraulic liquid whenever liquid appears in chamber 5.

As piston 2 moves to the right, gas within chamber 6 is pressurized to the desired charge pressure. Since piston 2 is in equilibrium, the hydraulic liquid within chamber 5 assumes a pressure equal to the high gas pressure.

When the high pressure liquid charge within chamber 5 is released through passage 9 on demand, piston-poppet assembly 1 seals the liquid discharge port leading into passage 9 (as previously described) to capture a quantity of hydraulic liquid within reduced chamber 5 to create liquid-gas pressure balance on opposite sides of piston seal 13. This pressure balance substantially eliminates leakage at this seal.

Figure 7:
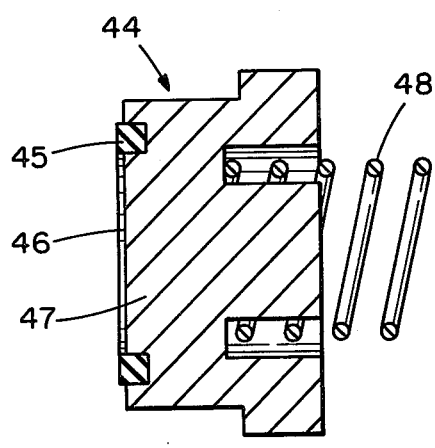
FIG. 7 is a section view of a second preferred embodiment of a piston-poppet assembly.
Figure 8:
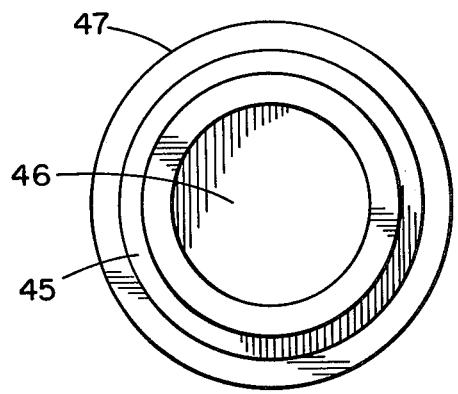
FIG. 8 is an end view of the piston-poppet assembly of FIG. 7.

A simplified piston-poppet assembly 44 is shown in FIG. 7. This alternative assembly can be substituted for piston-poppet assembly 1 of FIGS. 1, 2, 3, 5 and 6. In assembly 44, the seal is effected by a single annular seal 45 lodged within a circular groove formed at face 46 of piston-poppet 47. Helical spring 48 is identical to helical spring 21. Piston-poppet assembly 1 retains its poppet seal 24 more securely than does assembly 44; however, assembly 44 is cheaper and easier to manufacture than assembly 1.

It should be understood, that modifications can be made to the described embodiments without departing from the scope of the invention.

What is claimed is:

1. In an accumulator having a piston reciprocating within the bore of a cylinder to subdivide the bore into a hydraulic chamber and a gas chamber of variable volumes, the piston having a first face common to the hydraulic chamber and a second face common to the gas chamber, first means closing one end of the cylinder bore and formed with a hydraulic passage terminating in an opening to the chamber whose immediate periphery defines a poppet seat, the first cylinder-bore closing means together with the first piston face and the cylinder defining the hydraulic chamber, and second means closing the other end of the cylinder bore and formed with a gas passage communicating with the gas chamber, the improvement for substantially equalizing the gas and hydraulic pressures on a piston enveloping seal in response to a momentary relatively large pressure differential between the hydraulic and gas chamber pressures by which a greater gas pressure drives the piston toward the first closing means, comprising a socket-like recess formed in the piston having a closed bottom and sidewalls with the only recess opening being opposite the bottom and which opening appears at the first piston face, a floating piston-poppet seal assembly partially disposed within the socket-like recess and having a seal portion extending into the hydraulic chamber to face the first closing means and with the piston-poppet seal assembly being substantially removed from contact with the cylinder, spring means operating between the piston and the piston-poppet seal assembly continuously exerting a force tending to force the piston-poppet seal assembly away from the piston, and means supporting the piston-poppet seal assembly on the piston enabling the piston-poppet seal assembly to reciprocate relative the piston to seal the hydraulic passage by seating on the poppet seat and trap thusly a volume of pressurized hydraulic liquid within the hydraulic chamber in response to a pressure differential which drives the piston-poppet seal assembly into contact with the poppet seat thus substantially equalizing the gas pressures on both sides of the piston enveloping seal.

2. The combination of claim 1 in which the diameter of the cylinder bore substantially exceeds the maximum diametrical dimension of the piston-poppet seal assembly so that when the piston-poppet seal assembly rests against the poppet seat, most of the surface of the first closing means which defines the hydraulic chamber continues to define the hydraulic chamber.

3. The combination of claim 2 in which the piston-poppet seal assembly has an annular seal which is mechanically compressed between the first cylinder bore closing means and the remaining portion of the piston-poppet seal assembly when the hydraulic opening is sealed.

* * * * *

UNITED STATES PATENT AND TRADEMARK OFFICE
CERTIFICATE OF CORRECTION

PATENT NO. : 4,461,322
DATED : July 24, 1984
INVENTOR(S) : Carl R. Mills

It is certified that error appears in the above-identified patent and that said Letters Patent is hereby corrected as shown below:

Column 1, line 9, change "as" to -- an --

Signed and Sealed this

Twenty-seventh Day of November 1984

[SEAL]

Attest:

GERALD J. MOSSINGHOFF

Attesting Officer

Commissioner of Patents and Trademarks